United States Patent
Robatmili et al.

(10) Patent No.: US 9,740,504 B2
(45) Date of Patent: *Aug. 22, 2017

(54) HARDWARE ACCELERATION FOR INLINE CACHES IN DYNAMIC LANGUAGES

(71) Applicant: QUALCOMM Incorporated, San Diego, CA (US)

(72) Inventors: Behnam Robatmili, San Jose, CA (US); Gheorghe Calin Cascaval, Palo Alto, CA (US); Madhukar Nagaraja Kedlaya, Santa Clara, CA (US); Dario Suarez Gracia, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

This patent is subject to a terminal disclaimer.

(21) Appl. No.: 14/262,871

(22) Filed: Apr. 28, 2014

(65) Prior Publication Data

US 2015/0205720 A1 Jul. 23, 2015

Related U.S. Application Data

(60) Provisional application No. 61/930,818, filed on Jan. 23, 2014.

(51) Int. Cl.
*G06F 9/44* (2006.01)
*G06F 12/08* (2016.01)
*G06F 12/0802* (2016.01)

(52) U.S. Cl.
CPC ........ *G06F 9/4431* (2013.01); *G06F 12/0802* (2013.01)

(58) Field of Classification Search
CPC .................... G06F 9/4431; G06F 12/0802
See application file for complete search history.

(56) References Cited

U.S. PATENT DOCUMENTS 7,353,364 B1 4/2008 Chong et al.
2002/0087798 A1* 7/2002 Perincherry ........ G06F 17/3048
711/133

(Continued)

OTHER PUBLICATIONS

Advances in JavaScript Performance in IE10 and Windows 8, 2012, Retrieved on Mar. 2, 2014, Retrieved from the Internet <URL: http://blogs.msdn.com/b/ie/archive/2012/06/13/advances-in-javascript-performance-in-ie10-and-windows-8.aspx >, 17 Pages.

(Continued)

*Primary Examiner* — Michael Alsip
(74) *Attorney, Agent, or Firm* — The Marbury Law Group, PLLC

(57) ABSTRACT

Aspects include apparatuses, systems, and methods for hardware acceleration for inline caches in dynamic languages. An inline cache may be initialized for an instance of a dynamic software operation. A call of an initialized instance of the dynamic software operation may be executed by an inline cache hardware accelerator. The inline cache may be checked to determine that its data is current. When the data is current, the initialized instance of the dynamic software operation may be executed using the related inline cache data. When the data is not current, a new inline cache may be initialized for the instance of the dynamic software operation, including the not current data of a previously initialized instance of the dynamic software operation. The inline cache hardware accelerator may include an inline cache memory, a coprocessor, and/or a functional until one an inline cache pipeline connected to a processor pipeline.

30 Claims, 8 Drawing Sheets

(56) References Cited

U.S. PATENT DOCUMENTS

| | | |
|---|---|---|
| 2009/0013128 A1 | 1/2009 | Peterson |
| 2012/0304159 A1* | 11/2012 | Ceze .................... G06F 8/44 717/140 |
| 2013/0205286 A1 | 8/2013 | Barraclough et al. |
| 2015/0067267 A1* | 3/2015 | Pizlo .................. G06F 12/0815 711/141 |
| 2015/0067658 A1 | 3/2015 | Hahnenberg |
| 2015/0205726 A1 | 7/2015 | Robatmili et al. |

OTHER PUBLICATIONS

Li S., et al., "TypeCastor. Demystify Dynamic Typing of JavaScript Applications," High Performance Embedded Architectures and Compilers, 2011, 11 pages.
Zakirov S., "A study of superinstructions and dynamic mixin optimizations," Feb. 2011, 103 Pages.
Cai S., et al., "JVM Virtual Method Invoking Optimization Based on CAM Table," 6th IEEE International Conference on Networking, Architecture and Storage (NAS), Jul. 28, 2011 (Jul. 28, 2011), pp. 122-129, XP032048442, DOI: 10.1109/NAS.2011.13, ISBN: 978-1-4577-1172-5.
Vijaykrishnan N., et al., "Object-Oriented Architectural Support for a Java Processor," In: Lecture Notes in Computer Sciences, Jan. 1, 1998 (Jan. 1, 1998), Springer Berlin Heidelberg, Berlin, Heidelberg, XP055176046, ISSN: 0302-9743, ISBN: 978-3-54-045234-8, vol. 1445, pp. 330-354, DOI:10.1007/Bfb0054098.
International Search Report and Written Opinion—PCT/US2015/012529—ISA/EPO—Mar. 26, 2015.

\* cited by examiner

HARDWARE ACCELERATION FOR INLINE CACHES IN DYNAMIC LANGUAGES

RELATED APPLICATIONS

This application claims the benefit of priority to U.S. Provisional Application No. 61/930,818 entitled "Hardware Acceleration For Inline Caches In Dynamic Languages" filed Jan. 23, 2014, the entire contents of which are hereby incorporated by reference.

BACKGROUND

Dynamic programming languages, such as JavaScript, Python, and Ruby, are often used to execute common behaviors at runtime that other languages may execute while compiling the code. Dynamic programming languages increase the flexibility of a software program, often slowing down execution due to additional runtime compilation. Inline caches are a technique frequently used to reduce code execution overhead for dynamic languages by generating "fast code" from common templates for the common behaviors. However, inline caches increase the memory usage of the program, by storing additional inline cached code and constant values. In particular for mobile devices, memory is a constrained resource.

SUMMARY

The various aspects focus on methods and apparatuses for increasing the processing speed of dynamic language software on a computing device. Aspect methods may include initializing a first inline cache for an first instance of a dynamic software operation by a processor, storing the first inline cache in a memory configured to provide fast access for storing and retrieving the first inline cache, receiving a second instance of the dynamic software operation in the processor, determining whether the first instance of the dynamic software operation and the second instance of the dynamic software operation are the same, executing the second instance of the dynamic software operation by a functional unit using the first inline cache from the memory in response to determining that the first instance of the dynamic software operation and the second instance of the dynamic software operation are the same, and returning a result of executing the second instance of the dynamic software operation by the functional unit.

An aspect method may further include receiving an object type for the second instance of the dynamic software operation by the functional unit, receiving an object identifier for the second instance of the dynamic software operation by the functional unit, and receiving inline cache data for the second instance of the dynamic software operation by the functional unit. In an aspect, executing the second instance of the dynamic software operation by the functional unit using the first inline cache from the memory in response to determining that the first instance of the dynamic software operation and the second instance of the dynamic software operation are the same may include using the object type, the object identifier, and the inline cache data for the second instance of the dynamic software operation as parameters for executing the second instance of the dynamic software operation.

In an aspect, determining whether the first instance of the dynamic software operation and the second instance of the dynamic software operation are the same may include comparing a first object implementation related to the first instance of the dynamic software operation with a second object implementation related to the second instance of the dynamic software operation, and determining whether the first object implementation and the second object implementation are the same.

An aspect method may further include initializing a second inline cache for the second instance of the dynamic software operation including the first inline cache configured to replace the initialized first inline cache in response to determining that the first instance of the dynamic software operation and the second instance of the dynamic software operation are different, storing the second inline cache in the memory configured to provide fast access for storing and retrieving the second inline cache, and executing the second instance of the dynamic software operation by the functional unit using the second inline cache from the memory in response to determining that the first instance of the dynamic software operation and the second instance of the dynamic software operation are different.

An aspect method may further include determining whether the first inline cache exists for the first instance of the dynamic software operation, and in which initializing the first inline cache for the first instance of the dynamic software operation by the processor may include initializing the first inline cache for the first instance of the dynamic software operation by the processor in response to determining that the first inline cache for the first instance of the dynamic software operation does not exist.

In an aspect method, initializing the first inline cache for the first instance of the dynamic software operation by the processor may include traversing an object implementation for the dynamic software operation until identifying a data of the object implementation relating to the first instance of the dynamic software operation, executing the dynamic software operation of the first instance of the dynamic software operation, and returning a result of the first instance of the dynamic software operation.

In an aspect, returning the result of executing the second instance of the dynamic software operation by the functional unit may include returning the result directly to the processor.

In an aspect, returning the result of executing the second instance of the dynamic software operation by the functional unit may include returning the result to the processor indirectly through a data cache accessible to the processor and the functional unit.

An aspect method may further include generating software instructions for the processor by a compiler, and instructing the processor to run the functional unit to perform operations that may include initializing the first inline cache for the first instance of the dynamic software operation by a processor, storing the first inline cache in the memory configured to provide fast access for storing and retrieving the first inline cache, receiving the second instance of the dynamic software operation in the processor, determining whether the first instance of the dynamic software operation and the second instance of the dynamic software operation are the same, executing the second instance of the dynamic software operation by the functional unit using the first inline cache from the memory in response to determining that the first instance of the dynamic software operation and the second instance of the dynamic software operation are the same, and returning the result of executing the second instance of the dynamic software operation by the functional unit.

An aspect includes a computing device having a processor communicatively connected to a memory and configured with processor-executable instructions to perform operations of one or more of the aspect methods described above.

An aspect includes a non-transitory computer-readable medium having stored thereon processor-executable software instructions to cause a processor and a functional unit to perform operations of one or more of the aspect methods described above.

An aspect includes a computing device having means for performing functions of one or more of the aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
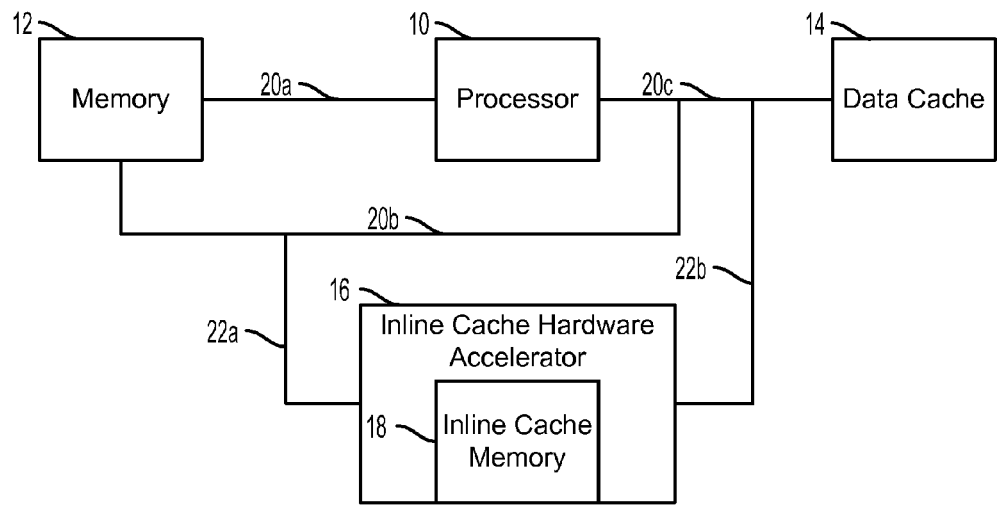
FIG. 1 is a component block diagram illustrating a computing device having an inline cache hardware accelerator and an inline cache memory attached to a processor pipeline, for hardware acceleration for inline caches in dynamic languages, in accordance with an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used interchangeably herein to refer to any one or all of cellular telephones, smartphones, personal or mobile multimedia players, personal data assistants (PDA's), laptop computers, tablet computers, phablets, smartbooks, ultrabooks, palm-top computers, wireless electronic mail receivers, multimedia Internet enabled cellular telephones, wireless gaming controllers, desktop computers, servers and similar personal or commercial electronic devices which include a memory, and a programmable processor.

The terms "system-on-chip" (SoC) and "integrated circuit" (IC) are used interchangeably herein to refer to a set of interconnected electronic circuits typically, but not exclusively, including one or more hardware cores, memory units, and communication interfaces. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon. Such a configuration may also be referred to as the IC components being on a single chip.

Inline caching is a technique used to speedup dynamic compilation for languages such as JavaScript, PHP, Python, and Ruby. A compiler (e.g., a static compiler, a runtime compiler, or a dynamic compiler) may identify patterns of bytecodes that exhibit common behaviors and may use code templates to generate executable code. The generated code may be parameterized with some object information and stored into an inline cache. The compiler may place guards to check whether the object matches the generated code, retrieve the code from the inline cache and call it. The inline cache code may obviate the need for generating the same sequence repeatedly.

However, inline caching introduces a different set of performance issues. In a typical computing device (or computing system), inline cache items are still executed by the processor and stored in the memory. Also, many of the common tasks may generate an inline cache item for various objects when the same inline cache item could provide the correct result when using the proper parameters. Thus, inline caching techniques may clutter up the processor, memory and/or pipeline and use up computing and power resources.

The various aspects include methods, devices, and non-transitory processor-readable storage media for increasing the processing speed of dynamic language software on a computing device. Hardware acceleration for inline caches in dynamic languages may utilize dedicated resources to manage the inline cache items for common tasks and take the burden off of the typical components of a computing device, such as an applications processor, pipeline, and memory. In particular, an inline cache hardware accelerator may include at least some dedicated memory and some dedicated processing. The dedicated memory may be implemented as a separate memory, as a part of a data cache, or as part of a system memory. The dedicated processing may be implemented as extensions to an existing processor execution pipeline, as a processor functional unit, as a coprocessor communicating with a core processor through existing coprocessor interfaces, or as a separate unit communicating with the processor through a proprietary interface. Hardware acceleration for inline caches in dynamic languages may be implemented along with the common inline caching, such that certain tasks are dedicated for hardware acceleration while others, likely the less common tasks, may continue to be managed by the typical components of the computing device.

The components for hardware acceleration for inline caches in dynamic languages may be separate but connected to the typical components of the computing device. For example, the computing device may contain a processor pipeline for transmitting signals between the various other components, such as the processor and a data cache. The components for hardware acceleration for inline caches in dynamic languages may be connected to each other and to the processor pipeline by an inline cache pipeline that may allow the components for hardware acceleration for inline caches in dynamic languages to transmit signals to each other and to the typical components of the computing device. This arrangement may allow the hardware acceleration for inline caches in dynamic languages to operate without impeding the operation of the typical components until communication with the typical components is necessary. The components for hardware acceleration for inline caches in dynamic languages may communicate with certain of the typical components either directly via the connected pipelines, or indirectly through the other typical components.

FIG. 1 illustrates a computing device having an inline cache hardware accelerator and an inline cache memory attached to a processor pipeline, for hardware acceleration for inline caches in dynamic languages, in accordance with an aspect. A computing device may include a processor 10, registers or a memory 12, such as an accumulator or for storing stacks or register files, a data cache 14, an inline cache hardware accelerator 16, an inline cache memory 18, a processor pipeline 20a, 20b, 20c, and an inline cache pipeline 22a, 22b. The processor 10 may be one or more of a variety of different types of processors as described above. The processor 10 may be configured to execute compiled and/or interpreted executable operations from software programs. In an aspect, the software programs may be written in a dynamic programming language and the executable operations may be compiled or interpreted at runtime. The processor 10 may also be configured to execute sets of instructions to manage and interact with other components of the computing device to execute portions of the dynamic programming language software programs.

The memory 12 may be configured to store state values for various states of the computing device. The state values stores in the memory 12 may be accessible for read and write operations by the processor 10. The data cache 14 may be configured to store data related to the executable operations executed by the processor 10. The data stored in the data cache 14 may be input to the processor 10 to execute the executable operations, or output by the processor 10 resulting from the executed operations and stored for later use or for access by other components of the computing device. The processor 10, the memory 12, and the data cache 14 may be connected to each other by the processor pipeline 20a, 20b, 20c. The processor pipeline 20a, 20b, 20c may be configured to transmit signals representing the executable operations, the computing device states, and the software program data between the components connected to it.

The inline cache hardware accelerator 16 which may be configured to increase the speed of processing executable operations from dynamic programming language software programs (or "dynamic software operations"). The configurations of the inline cache hardware accelerator 16 are discussed in further detail below. The inline cache memory 18 may be configured to provide fast access for storing and retrieving data, and may be configured to store constant values associated with instances of the dynamic software operations executed by the processor 10, at least initially. The constant values may be associated with a particular instance of an object used to execute a dynamic software operation, such that the constant value may be recalled for future execution of the same instance of the object for the dynamic software operation. In an aspect, the dynamic software operation may include one operation or a set of operations, and therefore references to singular operation and plural operations are not intended to limit the scope of the claims in terms of the number of executable operations unless explicitly recited in a claim.

The inline cache memory 18 may be dedicated for this specific purpose, and therefore may be relatively small and fast memory because the storing of constants may not require a lot of space, and providing quick access to the inline cache memory 18 for read and write operations may facilitate increasing the processing speed of the dynamic software operations. Access to the inline cache memory 18 may be limited to the inline cache hardware accelerator 16. In an aspect, the inline cache memory 18 may be included as part of the inline cache hardware accelerator 16. An inline cache pipeline 22a, 22b may connect the inline cache hardware accelerator 16 and the inline cache memory 18 to the processor 10, the memory 12, and the data cache 14. The inline cache pipeline 22a, 22b may connect directly to the other components of the computing device, or may connect to the processor pipeline 20a, 20b, 20c. The inline cache pipeline 22a, 22b may be configured to transmit signals representing data used to execute dynamic software operations, the computing device states, and/or data resulting from the execution of the dynamic software, including the constant values stored on the inline cache memory 18.

Figure 2:
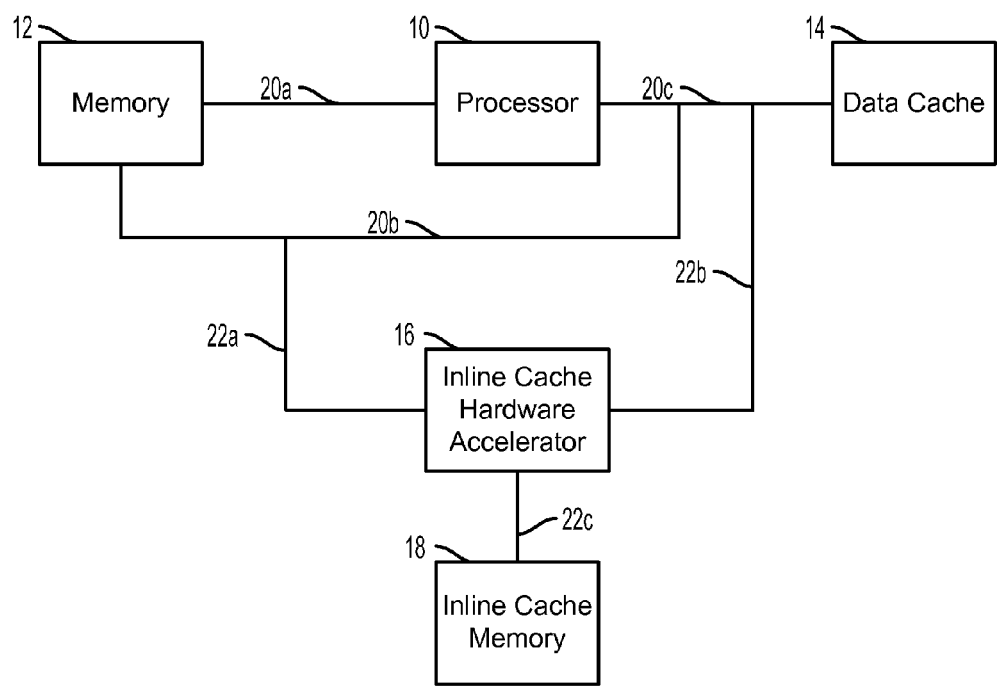
FIG. 2 is a component block diagram illustrating a computing device having an inline cache hardware accelerator and an inline cache memory attached to a processor pipeline, for hardware acceleration for inline caches in dynamic languages, in accordance with another aspect.

FIG. 2 illustrates a computing device having an inline cache hardware accelerator and an inline cache memory attached to a processor pipeline, for hardware acceleration for inline caches in dynamic languages, in accordance with an aspect. Similar to the computing device illustrated in FIG. 1, the computing device may include the processor 10, the registers or the memory 12, the data cache 14, the inline cache hardware accelerator 16, the inline cache memory 18, the processor pipeline 20a, 20b, 20c, and the inline cache pipeline 22a, 22b. In an aspect the inline cache memory 18 may be separate from the inline cache hardware accelerator 16. In various aspects, the inline cache memory 18 may be a standalone memory, memory integrated into the cache hierarchy, or a portion of the system memory of the computing device. The computing device may also include an inline cache pipeline 22c further configured to connect the inline cache hardware accelerator 16 and the inline cache memory 18. The inline cache memory 18 may be accessible by the inline cache hardware accelerator 16, and by the other components, such as the processor 10, through the inline cache hardware accelerator 16.

Figure 3:
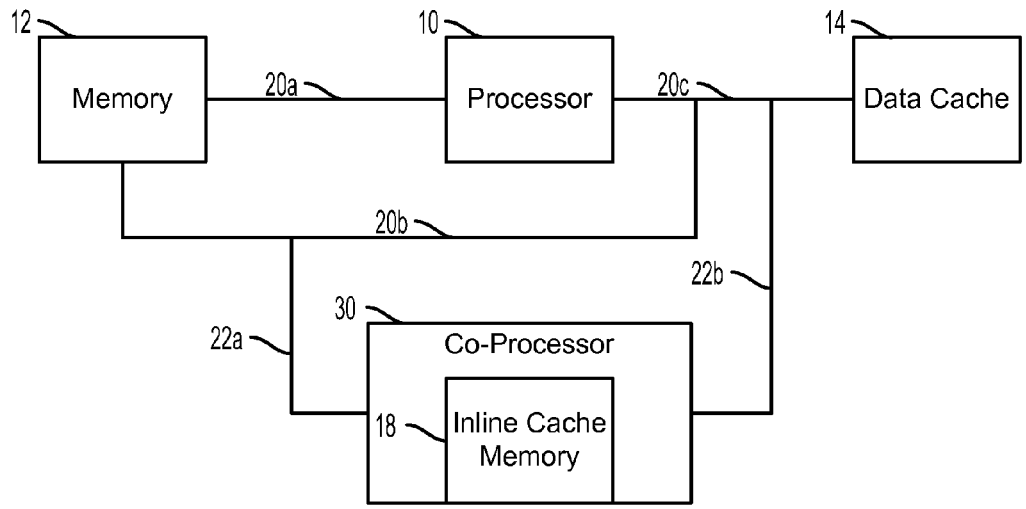
FIG. 3 is a component block diagram illustrating a computing device having a coprocessor and an inline cache memory attached to a processor pipeline, for hardware acceleration for inline caches in dynamic languages, in accordance with an aspect.

FIG. 3 illustrates a computing device having a coprocessor and an inline cache memory attached to a processor pipeline, for hardware acceleration for inline caches in dynamic languages, in accordance with an aspect. Similar to the computing device illustrated in FIG. 1, the computing device may include the processor 10, the registers or the memory 12, the data cache 14, the inline cache memory 18, the processor pipeline 20*a*, 20*b*, 20*c*, and the inline cache pipeline 22*a*, 22*b*. In an aspect the inline cache hardware accelerator may be a coprocessor 30 configured to execute the dynamic software operations. The coprocessor 30, like the processor 10, may be one or more of a variety of different types of processors as described above. In an aspect, the coprocessor 30 may be a programmable logic device programmed to execute one or more dynamic software operations. In an aspect, the programmable coprocessor 30 may be reprogrammable to execute a different dynamic software operation. In another aspect, the computing device may include multiple coprocessors 30, each configured to execute a specific dynamic software operation. The dynamic software operations may be typical executable operations and the one or more coprocessors 30 may be provided for inclusion in the computing device on the basis of the typical dynamic software operations for the computing device. In an aspect, the inline cache memory 18 may be included as part of and/or dedicated to the coprocessor 30. In another aspect, the inline cache memory 18 may be one or more inline cache memories 18 shared across multiple coprocessors 30. In an aspect, the coprocessor 30 may be implemented as a functional extension of the processor pipeline 20*a*, 20*b*, 20*c*, and configured with instructions to initialize the inline cache memory 18, to execute the code stored in the inline cache memory 18, and to query the inline cache memory 18 for the presence of code for a first instance of a dynamic software operation. In an aspect, the coprocessor 30 may be implemented as a standalone unit communicating with the processor 10 using standard coprocessor interfaces. Such communications may include transferring initial values, initiating computation, and transferring output results. In another aspect, the coprocessor 30 may be implemented as a standalone unit communicating with the processor 10 using an enhanced interface, allowing the processor 10 to provide more information to the coprocessor 30 (e.g., an object map).

As described in further detail below, the processor 10 may pass data to the coprocessor 30 relating to an instance of a dynamic software operation. The coprocessor 30 may determine whether there are any inline cache data relating to the instance of the dynamic software operation. When the coprocessor 30 determines that the instance of the dynamic software operation is not yet initialized (i.e., the dynamic software operation is "uninitialized") or that it is the first instance of the dynamic software operation, the coprocessor 30 may signal the processor 10 indicating that it cannot process the instance of the dynamic software operation. The coprocessor 30 may determine that the instance of the dynamic software operation is uninitialized by comparing data stored in the inline cache memory 18 with the data received from the processor 10. When there is no data in the inline cache memory 18 for the instance of the dynamic software operation, the coprocessor 30 may determine that the instance is uninitialized. The processor 10 may initialize the instance of the dynamic software operation and store the results of the instance as a constant value to the inline cache memory 18.

When there is data in the inline cache memory 18 for the instance of the dynamic software operation, the coprocessor 30 may determine that the instance is initialized. The coprocessor 30 may then determine whether the data stored in the inline cache memory 18 for the instance of the dynamic software operation is the correct data for the instance. The coprocessor 30 may determine that the stored data is not the correct data for the instance of the dynamic software operation by comparing the data stored in the inline cache memory 18 with the data received from the processor 10. When the data stored for the instance of the dynamic software operation does not match the data provided by the processor 10, the coprocessor 30 may determine that the data stored for the instance of the dynamic software operation is not the correct data, and as a result may signal the processor 10 indicating that the coprocessor 30 cannot process the instance of the dynamic software operation. The processor 10 may then initialize this instance of the dynamic software operation and store the results of the instance as another constant value to the inline cache memory 18.

Stored data for an instance of a dynamic software operation may not match data received from the processor 10 due to a change in an implementation for the objects, such as object maps, for the dynamic software operations. Such a change may associate instances of the objects with different values causing different results for functions for the instances of the objects, or instances of the dynamic software operations. Similar to the uninitialized instance above, an instance of a dynamic software operation may be uninitialized due to such a change.

When there is data in the inline cache memory 18 for the instance of the dynamic software operation and the data is correct data, the coprocessor 30 may return the constant value for the instance of the dynamic software operation to the processor 10. In an aspect, the above initialization of the instance for the dynamic software operation may include the processor 10 running the instance for the dynamic software operation as normal to implement its result. Some dynamic software operations are common and various instances of the dynamic software operations are called repeatedly. In many cases the same instance of the dynamic software operation is called repeatedly. The coprocessor 30 may be configured to increase the speed of the dynamic software operations by providing predetermined or precalculated results to the initialized instances of the dynamic software operation stored in a memory dedicated to storing the results (i.e., the inline cache memory 18).

Figure 4:
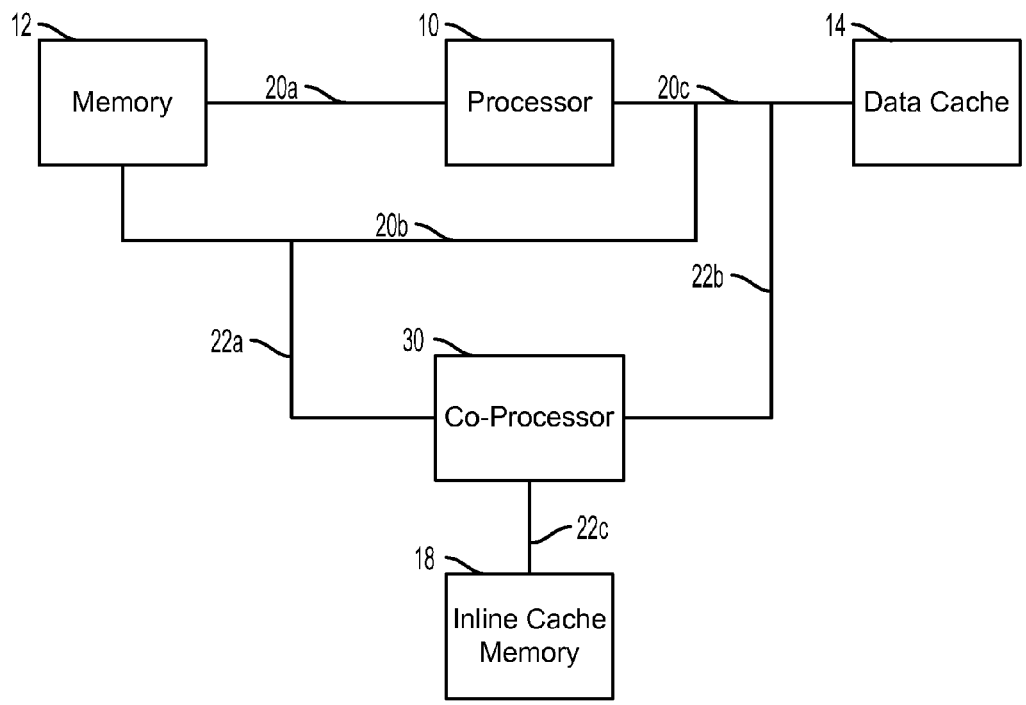
FIG. 4 is a component block diagram illustrating a computing device having a coprocessor and an inline cache memory attached to a processor pipeline, for hardware acceleration for inline caches in dynamic languages, in accordance with an aspect.

FIG. 4 illustrates a computing device having a coprocessor and an inline cache memory attached to a processor pipeline, for hardware acceleration for inline caches in dynamic languages, in accordance with an aspect. Similar to the computing device illustrated in FIG. 3, the computing device may include the processor 10, the registers or the memory 12, the data cache 14, the inline cache memory 18, the processor pipeline 20*a*, 20*b*, 20*c*, the inline cache pipeline 22*a*, 22*b*, and the coprocessor 30. In an aspect the inline cache memory 18 may be separate from the coprocessor 30. The computing device may also include the inline cache pipeline 22*c* further configured to connect the coprocessor 30 and the inline cache memory 18, like in FIG. 2. The inline cache memory 18 may be accessible by the coprocessor 30, and by the other components, such as the processor 10, through the coprocessor 30. In an aspect, the inline cache memory 18 may be dedicated to the coprocessor 30. In another aspect, the inline cache memory 18 may be one or more inline cache memories 18 shared across multiple coprocessors 30. Regardless of the difference in structures of the computing device illustrated in FIG. 4 and the computing device illustrated in FIG. 3, the operation of the computing devices and their components are substantially similar.

In aspects including the coprocessor 30, processors 10 may be configured to communicate with the coprocessor 30 and may not require alterations to the processors' instruction set architecture. In an aspect, data associated with the instances of the dynamic software operations may be explicitly passed from the processor 10 to the coprocessor 30. In another aspect, the coprocessor 30 may be able to communicate directly with the memory 12 and the data cache 14. This direct communication may allow for the coprocessor 30 to implicitly receive that data associated with the instances of the dynamic software operations from the processor 10 by way of the memory 12 and the data cache 14. Function calls to the coprocessor 30 by the processor 10 may include blocking type calls, where only one call may be handled at a time. Function calls to the coprocessor 30 by the processor 10 may include non-blocking or asynchronous type calls, which may allow for multiple calls concurrently in the inline cache pipeline 22a, 22b, 22c. Similarly, the function calls to the coprocessor 30 by the processor 10 may parallel type calls, which may allow for multiple calls simultaneously in the inline cache pipeline 22a, 22b, 22c.

Figure 5:
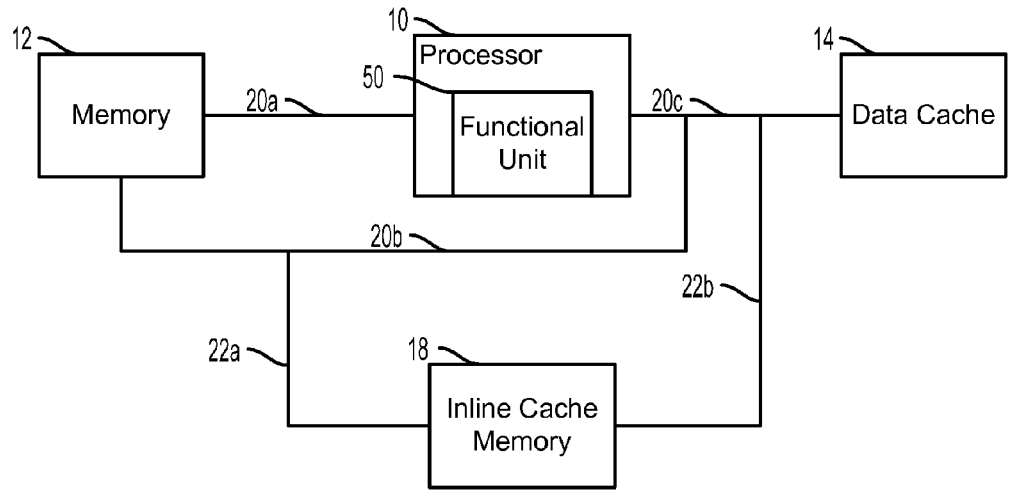
FIG. 5 is a component block diagram illustrating a computing device having a functional unit and an inline cache memory attached to a processor pipeline, for hardware acceleration for inline caches in dynamic languages, in accordance with another aspect.

FIG. 5 illustrates computing device having a functional unit and an inline cache memory attached to a processor pipeline, for hardware acceleration for inline caches in dynamic languages, in accordance with an aspect. Similar to FIG. 2, the computing device may include the processor 10, the registers or the memory 12, the data cache 14, the inline cache memory 18, the processor pipeline 20a, 20b, 20c, and the inline cache pipeline 22a, 22b. In an aspect the inline cache hardware accelerator may be a functional unit 50 configured to execute the dynamic software operations. The functional unit 50 may be a circuit configured to perform a specific function or calculation. For example, the functional unit 50 may be an adder or a multiplier. One or more functional units 50 may be combined to achieve the specific function or calculation. Multiple functional units 50 or groups of functional units 50 may be configured to implement a variety of different dynamic software operations. The function unit 50 may be an integrated component of the processor 10. In an aspect the inline cache memory 18 may be separate from the functional unit 50. The computing device may also include an inline cache pipeline further configured to connect the functional unit 50 and the inline cache memory 18. The inline cache memory 18 may be accessible by the functional unit 50 and the other components, such as the processor 10, through the functional unit 50. In an aspect, the inline cache memory 18 may be dedicated to functional unit 50. In another aspect, the inline cache memory 18 may be one or more inline cache memories 18 shared across multiple functional units 50.

As described in further detail below, the processor 10 may determine whether the instance of the dynamic software operation is initialized or uninitialized similar to how the coprocessor makes the determination in the description above. When the instance of the dynamic software operation is uninitialized, the processor 10 may execute the instance of the dynamic software operation to determine the result. The processor 10 may store the result of the executed instance of the dynamic software operation on the inline cache memory 18, such that the instance of the dynamic software operation may be initialized. When the processor 10 determines that the instance of the dynamic software operation is initialized, the processor 10 may pass data to one or more selected functional units 50 relating to the initialized instance of the dynamic software operation. The functional unit 50 selected by the processor 10 may be configured specifically to execute the dynamic software operation received by the processor 10. The processor 10 may match the dynamic software operation with the appropriate functional unit 50, and pass the appropriate data to the selected functional unit 50. The functional unit 50 may operate using the data from the processor 10 to determine the inline cache data relating to the instance of the dynamic software operation stored on the inline cache memory 18. The functional unit 50 may use the data from the processor 10 and execute the dynamic software operation for which it is configured to implement. The result of the initialized instance of the dynamic software operation may be the constant value stored on the inline cache memory 18, and may be passed to the processor 10 to complete the execution of the instance of the dynamic software operation.

In aspects including the functional unit 50, processors 10 may or may not be configured to communicate with the functional unit 50 and may or may not require alterations to the processors' instruction set architecture. In an aspect, data associated with the instances of the dynamic software operations may be explicitly passed from the processor 10 to the functional unit 50. In another aspect, the functional unit 50 may be able to communicate directly with the memory 12 and the data cache 14. This direct communication may allow for the functional unit 50 to implicitly receive that data associated with the instances of the dynamic software operations from the processor 10 by way of the memory 12 and the data cache 14. Function calls to the functional unit 50 by the processor 10 may include blocking type calls, where only one call may be handled at a time. Function calls to the functional unit 50 by the processor 10 may include non-blocking or asynchronous type calls, which may allow for multiple calls concurrently in the inline cache pipeline 22a, 22b. Similarly, the function calls to the functional unit 50 by the processor 10 may parallel type calls, which may allow for multiple calls simultaneously in the inline cache pipeline 22a, 22b.

Figure 6:
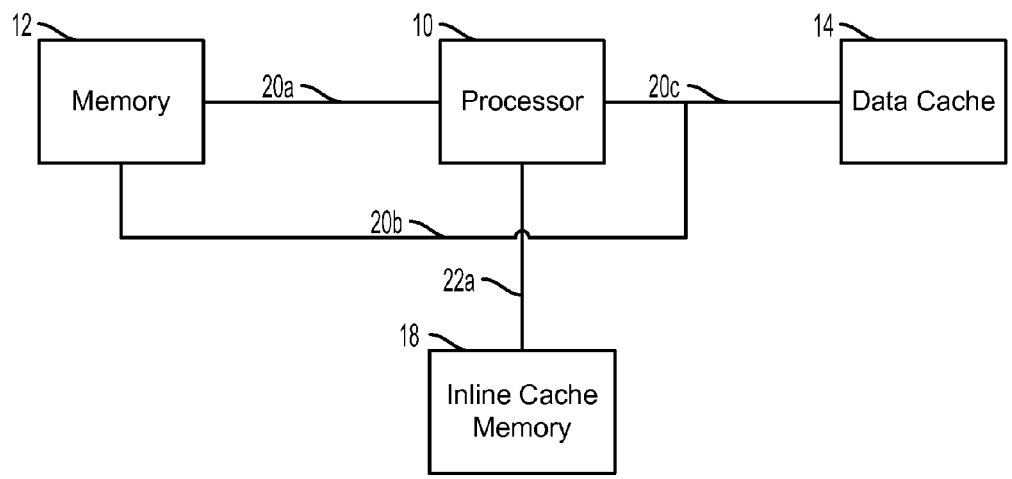
FIG. 6 is a component block diagram illustrating a computing device having an inline cache memory attached to a processor pipeline, for hardware acceleration for inline caches in dynamic languages, in accordance with an aspect.

FIG. 6 illustrates computing device having an inline cache memory attached to a processor pipeline, for hardware acceleration for inline caches in dynamic languages, in accordance with an aspect. Similar to the computing device illustrated in FIG. 1, the computing device may include a processor 10, registers or the memory 12, a data cache 14, an inline cache memory 18, a processor pipeline 20a, 20b, 20c, and an inline cache pipeline 22a. In an aspect, the inline cache hardware accelerator may be the inline cache memory 18 configured to store results of the instances of the dynamic software operations. In an aspect, the inline cache memory 18 may be one or more inline cache memories 18 shared for multiple instances of the dynamic software operations, one or more inline cache memories 18 each dedicated to storing multiple instances of the same dynamic software operation, or one inline cache memory 18 dedicated to storing all of the instances of all of the dynamic software operations.

As described in further detail below, the processor 10 may determine whether the instance of the dynamic software operation is initialized or uninitialized similar to how the coprocessor makes the determination that is described above. When the instance of the dynamic software operation is uninitialized, the processor 10 may execute the instance of the dynamic software operation to determine the result. The processor 10 may store the result of the executed instance of the dynamic software operation on the inline cache memory 18, such that the instance of the dynamic software operation may be initialized. When the processor 10 determines that the instance of the dynamic software operation is initialized, the processor 10 may retrieve the data stored on the inline cache memory 18 for the initialized instance of the dynamic software operation without having to fully execute the operation as it would if the operation were uninitialized.

In each of the forgoing aspect computing devices, the components, including the processor 10, the registers or the memory 12, the data cache 14, the inline cache hardware accelerator 16, the inline cache memory 18, the processor pipeline 20a, 20b, 20c, the inline cache pipeline 22a, 22b, 22c and the coprocessor 30, and the functional unit 50 may be configured in various combinations. Some or all of the components may comprise individual or combined components. Similarly, some or all of the components may be included as part of an SoC or one or more integrated circuits.

Figure 7:
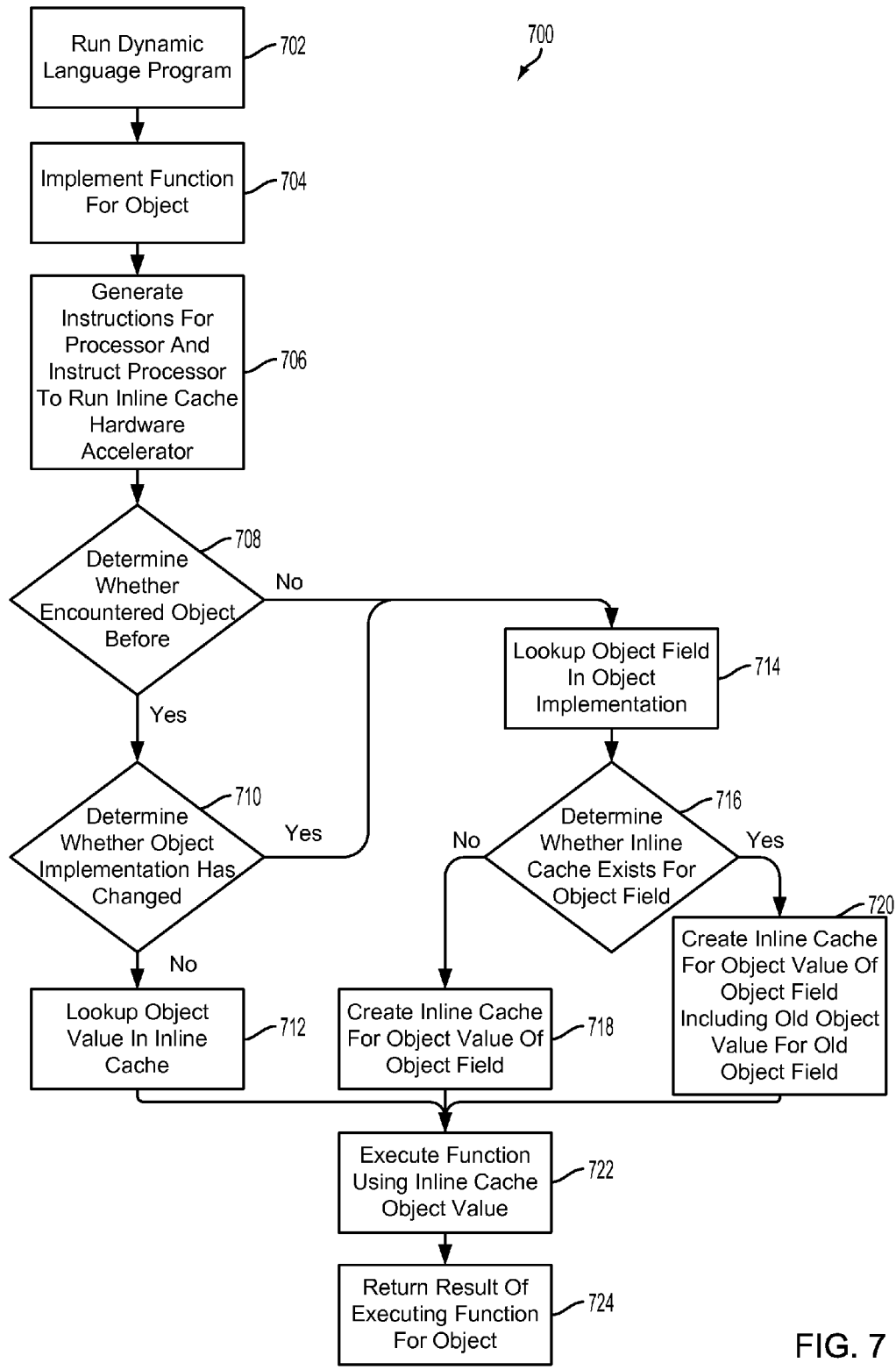
FIG. 7 is a process flow diagram illustrating an aspect method for utilizing inline cache code and constant initialization using hardware acceleration for inline caches in dynamic languages.

FIG. 7 illustrates an aspect method 700 for inline cache code and constant initialization using hardware acceleration for inline caches in dynamic languages. The computing device and its components, including the processor, the registers or the memory for register files, the data cache, the inline cache hardware accelerator, the inline cache memory, the processor pipeline, the inline cache pipeline, the coprocessor, and the functional unit, may execute the method 700. In block 702, the computing device may run the dynamic language executable program. In an aspect, the dynamic language executable program may be run in a web browser, a web application, or a standalone application. In block 704, the computing device may implement a function for an object, or the instance of the dynamic software operation. Common dynamic software operations, such as loading data, storing data, calling certain functions, and performing binary operations on data may be the types of dynamic software operations that may be included for hardware acceleration. In block 706, a compiler (e.g., a static compiler, a runtime compiler, or a dynamic compiler) may generate executable instructions for the processor to instruct the processor or a coprocessor to interact with and run the inline cache hardware accelerator for the instance of the dynamic software operation. These instructions may cause the processor or a coprocessor to read from and write to the inline cache memory either directly or through the inline cache hardware accelerator, and cause the inline cache hardware accelerator to function as described below.

In determination block 708, the computing device may determine whether the computing device has previously run the function for the object, or the instance of the dynamic software operation. In an aspect, the computing device may accomplish this by checking the inline cache memory for stored data related to the instance of the dynamic software operation. The determined presence of data related to the instance of the dynamic software operation on the inline cache memory may signify to the computing device that the instance of the dynamic software operation may be initialized. However the determination that the dynamic software operation is initialized may not be certain without a further determination discussed below. For example, data related to the instance of the dynamic software operation may be stored and thus may signify that a prior instance of the dynamic software operation was initialized, but that the data may not be current.

When the computing device determines that the instance of the dynamic software operation was previously run (i.e., determination block 708="Yes"), the computing device may determine whether the object implementation for the instance of the dynamic software operation has changed in determination block 710. Determining whether the object implementation of the instance of the dynamic software operation has changed may indicate to the computing device whether or not the data stored in the inline cache memory for the instance of the dynamic software operation is current data. When the computing device determines that the object implementation for the instance of the dynamic software operation has not changed (i.e., determination block 710="No"), the computing device may look up the value for the instance of the dynamic software operation stored on the inline cache memory in block 712. Determining that data exists in the inline cache memory for the instance of the dynamic software operation and that the data is current together may signify to the computing device that the instance of the dynamic software operation is initialized. In block 722, the computing device may execute any operations on the data from the inline cache memory requested by the processor as part of the dynamic software operation. In block 724, the computing device may return the data related to the instance of the dynamic software operation to the processor. The data may be returned to the processor either directly or indirectly through the memory for register files and/or the data cache.

When the computing device determines that the instance of the dynamic software operation was not previously run (i.e., determination block 708="No") or when the computing device determines that the object implementation for the instance of the dynamic software operation has changed (i.e., determination block 710="Yes"), the computing device may lookup related fields for the operation in an object implementation for the operation in block 714. It may be common for the processor to traverse the object implementation item by item until it finds the appropriate field associated with an object value for the operation. This process can be time and resource consuming, and inline cashing of the appropriate value helps to avoid repetition of this step for future instances of the dynamic software operation. Hardware acceleration furthers this effort by taking some of the processing involved in hardware caching from the processor and allotting it to the inline hardware accelerator, or by simplifying the storage and retrieval of the inline cached data.

In determination block 716, the computing device may determine whether an inline cache data exists for an instance of the dynamic software operation. This may be possible because a previous instance of the dynamic software operation may have been initialized but the current data for the instance of the dynamic operation may not match that of the previously initialized instance. When the computing device determines that no inline cache data exists for the instance dynamic software operation (i.e., determination block 716="No"), the computing device may create, or initialize, an inline cache data for the instance of the dynamic software operation in block 718. The computing device may continue to block 722 to execute any operations on the data requested by the processor as part of the instance of the dynamic software operation, and may perform the operations of block 724 to return the result of the instance.

When the computing device determines that an inline cache data exists for the instance dynamic software operation (i.e., determination block 716="Yes"), the computing device may create, or initialize, an inline cache data for the instance of the dynamic software operation including the inline cash data for the previous instance in block 720. For example, the computing device may initialize a second inline cache including a first inline cache configured to replace the initialized first inline cache when a first instance of a dynamic software operation and a second instance of the dynamic software operation are different. The computing device may continue to block 722 to execute any operations on the data requested by the processor as part of the instance of the dynamic software operation, and may perform the operations of block 724 to return the result of the instance.

In various aspects, the inline cache may have multiple allocation and replacement policies. For example, in blocks 718 and 720, the computing device may not initialize the inline cache data for every instance of the dynamic software operation. For example, an inline cache data may be initialized only after a second execution of a dynamic software operation. Other specified criteria may determine when an inline cache data may be initialized for a dynamic software operation, such as frequency of execution according to various metrics, complexity and/or cost of execution in terms of time and/or resources, or operation by a running program or application. In an aspect, initialized inline cache data may be removed, or uninitialized, for various reasons. For example, an inline cache data may be explicitly evicted with an operation from the inline cache, by conventional policies such as least recently used, least frequently used, first-in first-out, last-in first-out, and age. Other criteria, such as least complex and/or costly or most inline cache memory usage, may also be factors for removing inline cache data. In some aspects, the performance or space availability of the inline cache memory may determine when an inline cache data may be considered for removal. Some criteria for initializing or uninitializing may take into account current and/or historical data in determining whether to initialize or uninitialized inline cache data for a dynamic software operation. Removed inline cache data may be initialized again according to any of the described criteria, it may be required to meet other, potentially more stringent criteria than inline cache data yet to be initialized, or may be prevented from initialing for at least a certain period or until a certain event occurs. For example, removed inline cache data may be prevented from initializing again until a next running of a program, or until the inline caching is reset, like upon a reboot of the computing device.

Figure 8:
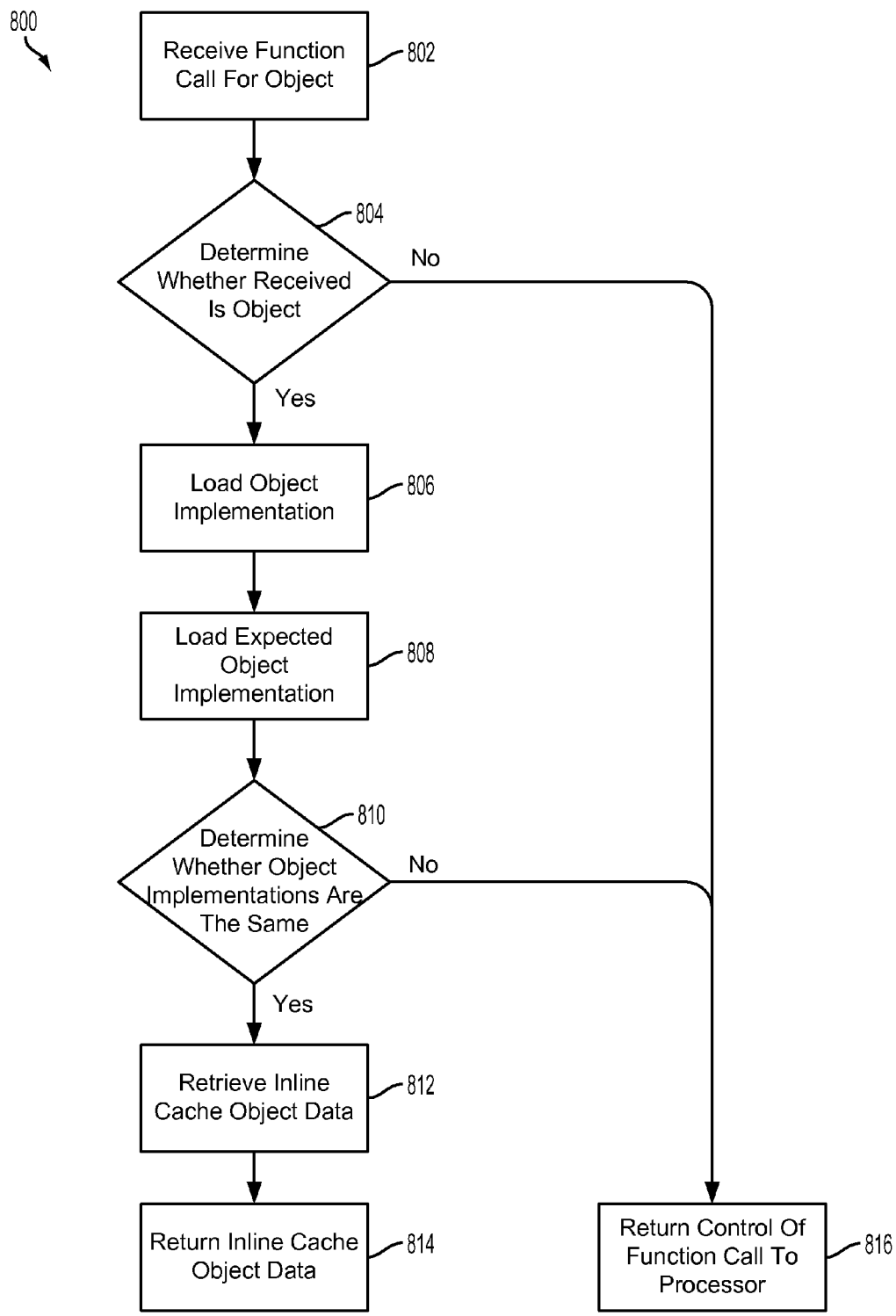
FIG. 8 is a process flow diagram illustrating an aspect method for use of inline cache code and constants by a processor for inline caches in dynamic languages.

FIG. 8 illustrates an aspect method 800 for use of inline cache code and constants by a processor for inline caches in dynamic languages. The computing device and its components, including the processor, the registers or the memory for register files, the data cache, the inline cache hardware accelerator, the inline cache memory, the processor pipeline, the inline cache pipeline, the coprocessor, and the functional unit, may execute the method 800. In block 802, the computing device may receive a function call for an instance of an object, or an instance of the dynamic software operation. In determination block 804, the computing device may determine whether the received data is an object, rather than a small integer, for example. When the computing device determines that the received data is not an object (i.e., determination block 804="No"), the computing device may return control of the function call to the processor in block 816.

When the computing device determines that the received data is an object (i.e., determination block 804="Yes"), the computing device may load the current object implementation for the instance of the dynamic software operation in block 806. In block 808, the computing device may load the expected object implementation for the instance of the dynamic software operation. The expected object implementation may be the object implementation used to initialize a previous instance of the dynamic software operation. In determination block 810, the computing device may determine whether the current object implementation and the expected object implementation are the same object implementation. This determination may be made by comparing an encoding of the current object with an encoding of the object stored with the inline cache at a time when the code in the inline cache was generated. This encoding may be an address of the object prototype, or an encoding of the object fields, or any other mechanism that can uniquely identify the structure of the object. It may be possible for an object implementation to change after the initialization of an instance of the dynamic software operation, and the result may be that the data from the object implementation for a current instance of the dynamic software operation may no longer match the data from the previous instance. Returning the wrong data based on the previous instance of the dynamic software operation may cause errors in the execution of the dynamic software. When the computing device determines that the current object implementation and the expected object implementation are different (i.e., determination block 810="No"), the computing device may return control of the function call to the processor in block 816.

When the computing device determines that the current object implementation and the expected object implementation are the same (i.e., determination block 810="Yes"), the computing device may retrieve the inline cache data in block 812. In block 814, the computing device may return the data related to the instance of the dynamic software operation to the processor. The data may be returned to the processor either directly or indirectly through the memory for register files and/or the data cache.

Figure 9:
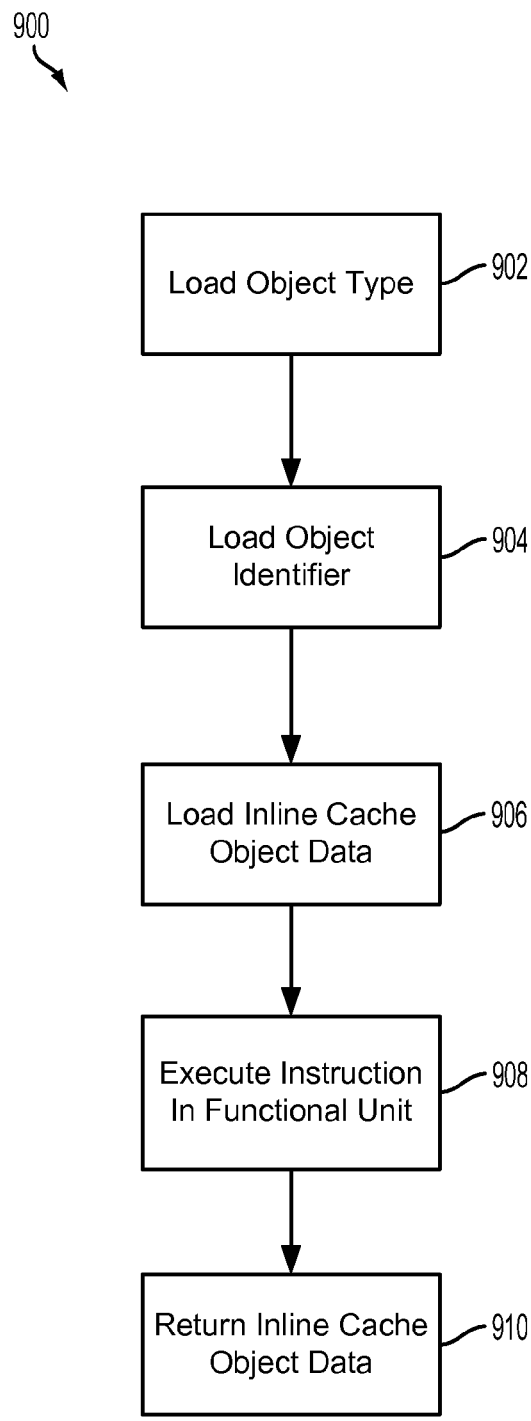
FIG. 9 is a process flow diagram illustrating an aspect method for use of inline cache code and constants by a functional unit for inline caches in dynamic languages.

FIG. 9 illustrates an aspect method 900 for use of inline cache code and constants by a functional unit for inline caches in dynamic languages. The computing device and its components, including the processor, the registers or the memory for register files, the data cache, the inline cache hardware accelerator, the inline cache memory, the processor pipeline, the inline cache pipeline, the coprocessor, and the functional unit, may execute the method 900. In block 902, the computing device may load an object type. The object type may indicate to the computing device what dynamic software operation is being run. In block 904, the computing device may load an object identifier. The object identifier may indicate to the computing device a specific instance of the dynamic software operation is being run, including an input value, for example. Using the information from the instance, in block 906, the computing device may load the inline cache data for the instance of the dynamic software operation. In block 908, the computing device may execute the dynamic software operation on the data for the instance. The computing device may use the object type, the object identifier, and the inline cache data as parameters to execute the dynamic software operation. In block 910, the computing device may return the data related to the instance of the dynamic software operation to the processor. The data may be returned to the processor either directly or indirectly through the memory for register files and/or the data cache.

Figure 10:
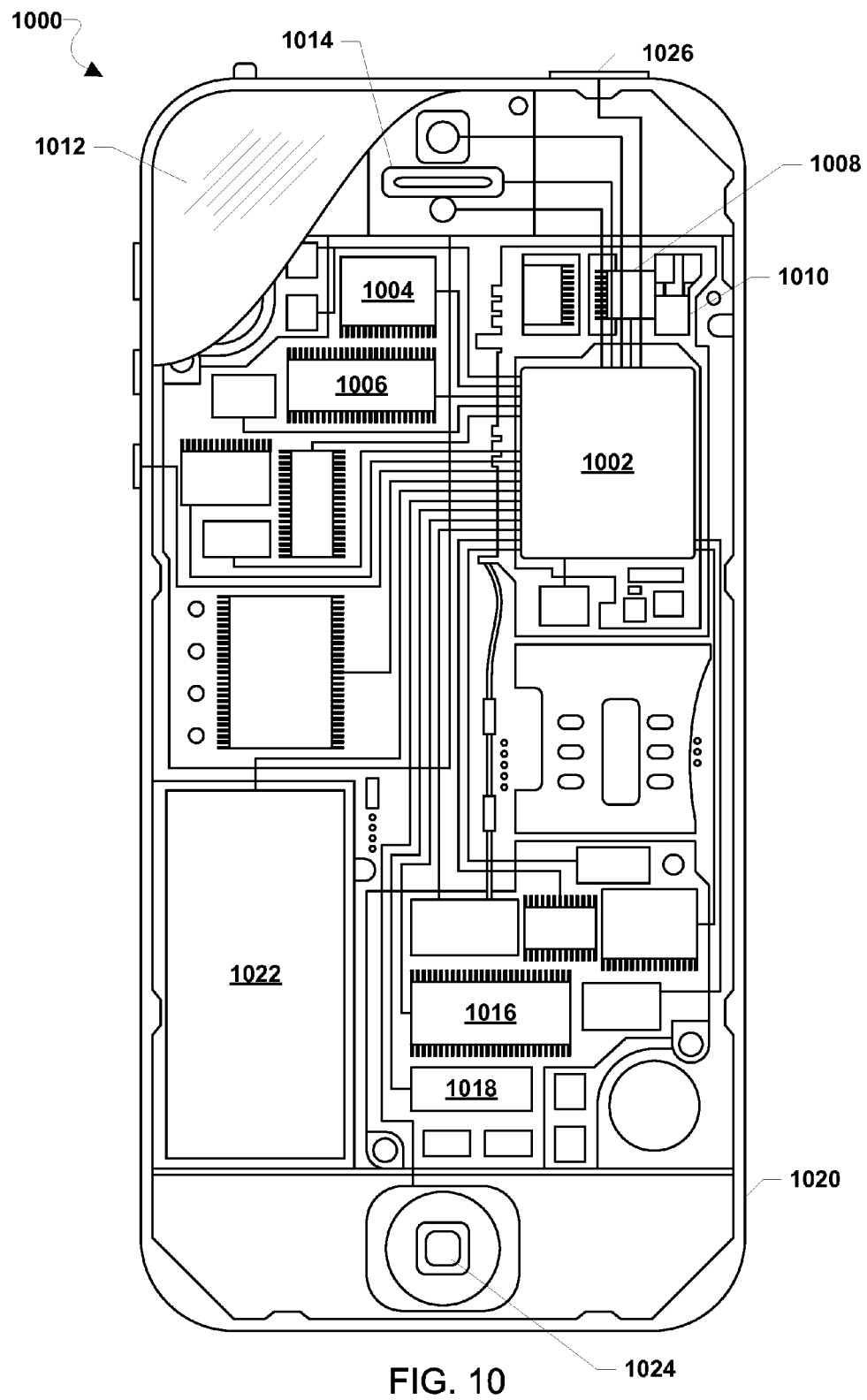
FIG. 10 is component block diagram illustrating an exemplary mobile computing device suitable for use with the various aspects.

FIG. 10 illustrates an exemplary mobile computing device suitable for use with the various aspects. The mobile computing device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the mobile computing device 1000 need not have touch screen capability.

The mobile computing device 1000 may have one or more radio signal transceivers 1008 (e.g., Peanut, Bluetooth, Zigbee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The mobile computing device 1000 may include a cellular network wireless modem chip 1016 that enables communication via a cellular network and is coupled to the processor.

The mobile computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as USB, FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components discussed herein. The mobile computing device 1000 may include a power source 1022 coupled to the processor 1002, such as a disposable or rechargeable battery. The rechargeable battery may also be coupled to the peripheral device connection port to receive a charging current from a source external to the mobile device 1000. The mobile computing device 1000 may also include a physical button 1024 for receiving user inputs. The mobile computing device 1000 may also include a power button 1026 for turning the mobile device 1000 on and off.

Figure 11:
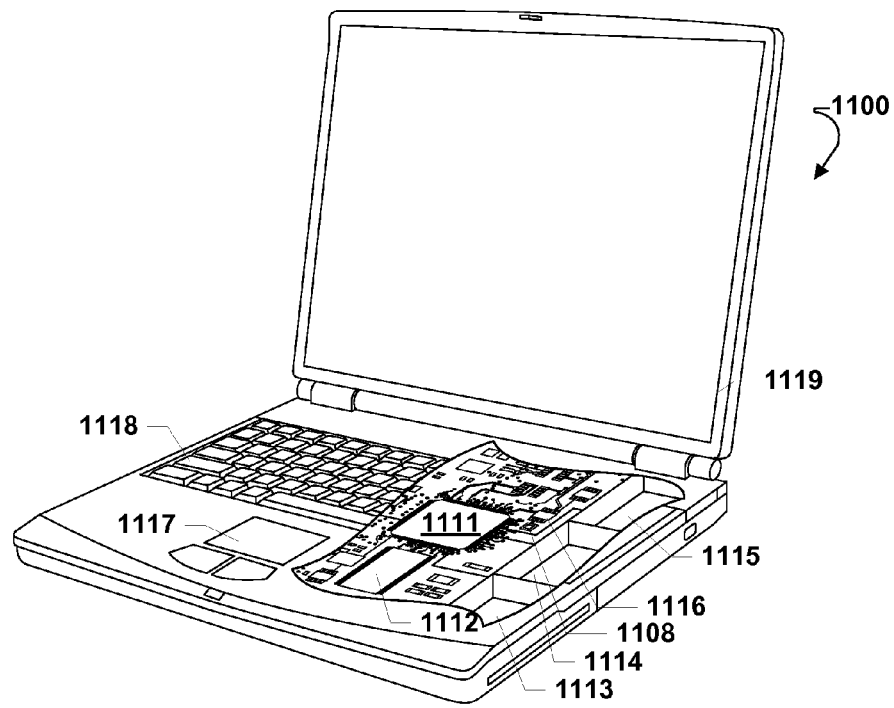
FIG. 11 is component block diagram illustrating an exemplary computing device suitable for use with the various aspects.

The various aspects described above may also be implemented within a variety of other types of computing devices, such as a laptop computing device 1100 illustrated in FIG. 11. Many laptop computers include a touchpad touch surface 1117 that serves as the computer's pointing device, and thus may receive drag, scroll, and flick gestures similar to those implemented on computing devices equipped with a touch screen display and described above. A laptop computing device 1100 will typically include a processor 1111 coupled to volatile memory 1112 and a large capacity nonvolatile memory, such as a disk drive 1113 of Flash memory. Additionally, the computing device 1100 may have one or more antenna 1108 for sending and receiving electromagnetic radiation that may be connected to a wireless data link and/or cellular telephone transceiver 1116 coupled to the processor 1111. The computing device 1100 may also include a floppy disc drive 1114 and a compact disc (CD) drive 1115 coupled to the processor 1111. In a notebook configuration, the computing device housing includes the touchpad 1117, the keyboard 1118, and the display 1119 all coupled to the processor 1111. Other configurations of the computing device may include a computer mouse or trackball coupled to the processor (e.g., via a USB input) as are well known, which may also be use in conjunction with the various aspects. A desktop computer may similarly include these computing device components in various configurations, including separating and combining the components in one or more separate but connectable parts.

Figure 12:
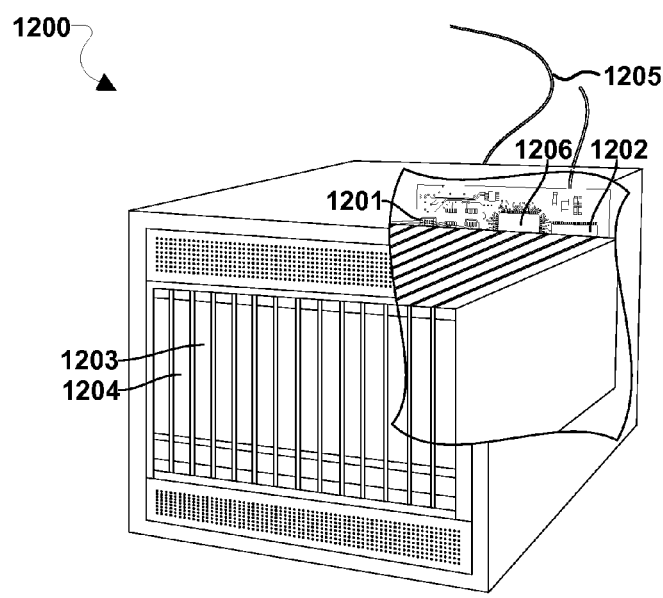
FIG. 12 is component block diagram illustrating an exemplary server device suitable for use with the various aspects.

The various embodiments may also be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1204. The server 1200 may also include a floppy disc drive, compact disc (CD) or DVD disc drive 1206 coupled to the processor 1201. The server 1200 may also include network access ports 1203 coupled to the processor 1201 for establishing network interface connections with a network 1205, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions, operations, or code on a non-transitory computer-readable medium or a non-transitory processor-readable medium. The operations of a method or algorithm disclosed herein may be embodied in a processor-executable software module comprising processor-executable instructions or operations that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions, operations, or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes instructions, and/or operations on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for increasing the processing speed of dynamic language software on a computing device, comprising:
    initializing a first inline cache for a first instance of a dynamic software operation by a processor;
    storing the first inline cache in a memory configured to provide fast access for storing and retrieving the first inline cache;
    receiving a second instance of the dynamic software operation in the processor;
    determining whether the first instance of the dynamic software operation and the second instance of the dynamic software operation are the same;
    executing the second instance of the dynamic software operation by a functional unit using the first inline cache from the memory in response to determining that the first instance of the dynamic software operation and the second instance of the dynamic software operation are the same; and
    returning a result of executing the second instance of the dynamic software operation by the functional unit.

2. The method of claim 1, further comprising:
    receiving an object type for the second instance of the dynamic software operation by the functional unit;
    receiving an object identifier for the second instance of the dynamic software operation by the functional unit; and
    receiving inline cache data for the second instance of the dynamic software operation by the functional unit.

3. The method of claim 2, wherein executing the second instance of the dynamic software operation by the functional unit using the first inline cache from the memory in response to determining that the first instance of the dynamic software operation and the second instance of the dynamic software operation are the same comprises using the object type, the object identifier, and the inline cache data for the second instance of the dynamic software operation as parameters for executing the second instance of the dynamic software operation.

4. The method of claim 1, wherein determining whether the first instance of the dynamic software operation and the second instance of the dynamic software operation are the same comprises:
    comparing a first object implementation related to the first instance of the dynamic software operation with a second object implementation related to the second instance of the dynamic software operation; and
    determining whether the first object implementation and the second object implementation are the same.

5. The method of claim 1, further comprising:
    initializing a second inline cache for the second instance of the dynamic software operation including the first inline cache configured to replace the initialized first inline cache in response to determining that the first instance of the dynamic software operation and the second instance of the dynamic software operation are different;
    storing the second inline cache in the memory configured to provide fast access for storing and retrieving the second inline cache; and
    executing the second instance of the dynamic software operation by the functional unit using the second inline cache from the memory in response to determining that the first instance of the dynamic software operation and the second instance of the dynamic software operation are different.

6. The method of claim 1, further comprising:
    determining whether the first inline cache exists for the first instance of the dynamic software operation; and
    wherein initializing the first inline cache for the first instance of the dynamic software operation by the processor comprises initializing the first inline cache for the first instance of the dynamic software operation by the processor in response to determining that the first inline cache for the first instance of the dynamic software operation does not exist.

7. The method of claim 1, wherein initializing the first inline cache for the first instance of the dynamic software operation by the processor comprises:
    traversing an object implementation for the dynamic software operation until identifying a data of the object implementation relating to the first instance of the dynamic software operation;
    executing the dynamic software operation of the first instance of the dynamic software operation; and
    returning a result of the first instance of the dynamic software operation.

8. The method of claim 1, wherein returning the result of executing the second instance of the dynamic software operation by the functional unit comprises returning the result directly to the processor.

9. The method of claim 1, wherein returning the result of executing the second instance of the dynamic software operation by the functional unit comprises returning the result to the processor indirectly through a data cache accessible to the processor and the functional unit.

10. The method of claim 1, further comprising:
generating software instructions for the processor by a compiler; and
instructing the processor to run the functional unit to perform operations comprising:
initializing the first inline cache for the first instance of the dynamic software operation by a processor;
storing the first inline cache in the memory configured to provide fast access for storing and retrieving the first inline cache;
receiving the second instance of the dynamic software operation in the processor;
determining whether the first instance of the dynamic software operation and the second instance of the dynamic software operation are the same;
executing the second instance of the dynamic software operation by the functional unit using the first inline cache from the memory in response to determining that the first instance of the dynamic software operation and the second instance of the dynamic software operation are the same; and
returning the result of executing the second instance of the dynamic software operation by the functional unit.

11. A computing device, comprising:
a memory configured to provide fast access for storing and retrieving at least one inline cache;
a processor communicatively connected to the memory and configured with processor-executable instructions to perform operations comprising:
initializing a first inline cache for a first instance of a dynamic software operation;
storing the first inline cache in the memory;
receiving a second instance of the dynamic software operation;
determining whether the first instance of the dynamic software operation and the second instance of the dynamic software operation are the same;
a functional unit communicatively connected to the processor and the memory and configured with functional unit-executable instructions to perform operations comprising:
executing the second instance of the dynamic software operation using the first inline cache from the memory in response to determining that the first instance of the dynamic software operation and the second instance of the dynamic software operation are the same; and
returning a result of executing the second instance of the dynamic software operation to the processor.

12. The computing device of claim 11, wherein the functional unit is further configured with functional unit-executable instructions to perform operations comprising:
receiving an object type for the second instance of the dynamic software operation;
receiving an object identifier for the second instance of the dynamic software operation; and
receiving inline cache data for the second instance of the dynamic software operation.

13. The computing device of claim 12, wherein the functional unit is further configured with functional unit-executable instructions to perform operations such that using the first inline cache from the memory in response to determining that the first instance of the dynamic software operation and the second instance of the dynamic software operation are the same comprises using the object type, the object identifier, and the inline cache data for the second instance of the dynamic software operation as parameters for executing the second instance of the dynamic software operation.

14. The computing device of claim 11, wherein the processor is further configured with processor-executable instructions to perform operations such that determining whether the first instance of the dynamic software operation and the second instance of the dynamic software operation are the same comprises:
comparing a first object implementation related to the first instance of the dynamic software operation with a second object implementation related to the second instance of the dynamic software operation; and
determining whether the first object implementation and the second object implementation are the same.

15. The computing device of claim 11, wherein:
the processor is further configured with processor-executable instructions to perform operations comprising:
initializing a second inline cache for the second instance of the dynamic software operation including the first inline cache configured to replace the initialized first inline cache in response to determining that the first instance of the dynamic software operation and the second instance of the dynamic software operation are different; and
storing the second inline cache in the memory; and
the functional unit is further configured with functional unit-executable instructions to perform operations comprising executing the second instance of the dynamic software operation using the second inline cache from the memory in response to determining that the first instance of the dynamic software operation and the second instance of the dynamic software operation are different.

16. The computing device of claim 11, wherein the processor is further configured with processor-executable instructions to perform operations comprising determining whether the first inline cache exists for the first instance of the dynamic software operation, and such that initializing the first inline cache for the first instance of the dynamic software operation comprises:
initializing the first inline cache for the first instance of the dynamic software operation in response to determining that the first inline cache for the first instance of the dynamic software operation does not exist;
traversing an object implementation for the dynamic software operation until identifying a data of the object implementation relating to the first instance of the dynamic software operation;
executing the dynamic software operation of the first instance of the dynamic software operation; and
returning a result of the first instance of the dynamic software operation.

17. The computing device of claim 11, wherein the processor is further configured with processor-executable instructions to perform operations comprising:
generating software instructions by a compiler; and
instructing the functional unit to perform operations comprising:
initializing the first inline cache for the first instance of the dynamic software operation;
storing the first inline cache in the memory;
receiving the second instance of the dynamic software operation;

determining whether the first instance of the dynamic software operation and the second instance of the dynamic software operation are the same;

executing the second instance of the dynamic software operation using the first inline cache from the memory in response to determining that the first instance of the dynamic software operation and the second instance of the dynamic software operation are the same; and returning the result of executing the second instance of the dynamic software operation to the processor.

18. A non-transitory computer-readable medium having stored thereon processor-executable software instructions to cause a processor and a functional unit to perform operations comprising:

initializing a first inline cache for a first instance of a dynamic software operation by a processor;

storing the first inline cache in a memory configured to provide fast access for storing and retrieving the first inline cache;

receiving a second instance of the dynamic software operation in the processor;

determining whether the first instance of the dynamic software operation and the second instance of the dynamic software operation are the same;

executing the second instance of the dynamic software operation by the functional unit using the first inline cache from the memory in response to determining that the first instance of the dynamic software operation and the second instance of the dynamic software operation are the same; and returning a result of executing the second instance of the dynamic software operation by the functional unit.

19. The non-transitory processor-readable medium of claim 18, wherein the stored processor-executable software instructions are configured to cause the processor and the functional unit to perform operations comprising:

receiving an object type for the second instance of the dynamic software operation by the functional unit;

receiving an object identifier for the second instance of the dynamic software operation by the functional unit; and receiving inline cache data for the second instance of the dynamic software operation by the functional unit.

20. The non-transitory processor-readable medium of claim 19, wherein the stored processor-executable software instructions are configured to cause the processor and the functional unit to perform operations such that executing the second instance of the dynamic software operation by the functional unit using the first inline cache from the memory in response to determining that the first instance of the dynamic software operation and the second instance of the dynamic software operation are the same comprises using the object type, the object identifier, and the inline cache data for the second instance of the dynamic software operation as parameters for executing the second instance of the dynamic software operation.

21. The non-transitory processor-readable medium of claim 18, wherein the stored processor-executable software instructions are configured to cause the processor and the functional unit to perform operations such that determining whether the first instance of the dynamic software operation and the second instance of the dynamic software operation are the same comprises:

comparing a first object implementation related to the first instance of the dynamic software operation with a second object implementation related to the second instance of the dynamic software operation; and determining whether the first object implementation and the second object implementation are the same.

22. The non-transitory processor-readable medium of claim 18, wherein the stored processor-executable software instructions are configured to cause the processor and the functional unit to perform operations comprising:

initializing a second inline cache for the second instance of the dynamic software operation including the first inline cache configured to replace the initialized first inline cache in response to determining that the first instance of the dynamic software operation and the second instance of the dynamic software operation are different;

storing the second inline cache in the memory configured to provide fast access for storing and retrieving the second inline cache; and executing the second instance of the dynamic software operation by the functional unit using the second inline cache from the memory in response to determining that the first instance of the dynamic software operation and the second instance of the dynamic software operation are different.

23. The non-transitory processor-readable medium of claim 18, wherein the stored processor-executable software instructions are configured to cause the processor and the functional unit to perform operations comprising determining whether the first inline cache exists for the first instance of the dynamic software operation, and such that initializing the first inline cache for the first instance of the dynamic software operation by the processor comprises:

initializing the first inline cache for the first instance of the dynamic software operation by the processor in response to determining that the first inline cache for the first instance of the dynamic software operation does not exist;

traversing an object implementation for the dynamic software operation until identifying a data of the object implementation relating to the first instance of the dynamic software operation;

executing the dynamic software operation of the first instance of the dynamic software operation; and returning a result of the first instance of the dynamic software operation.

24. The non-transitory processor-readable medium of claim 18, wherein the stored processor-executable software instructions are configured to cause the processor and the functional unit to perform operations comprising:

generating software instructions for the processor by a compiler; and instructing the processor to run the functional unit to perform operations comprising:

initializing the first inline cache for the first instance of the dynamic software operation;

storing the first inline cache in the memory;

receiving the second instance of the dynamic software operation;

determining whether the first instance of the dynamic software operation and the second instance of the dynamic software operation are the same;

executing the second instance of the dynamic software operation using the first inline cache from the memory in response to determining that the first instance of the dynamic software operation and the second instance of the dynamic software operation are the same; and returning the result of executing the second instance of the dynamic software operation to the processor.

25. A computing device, comprising:
   means for initializing a first inline cache for a first instance of a dynamic software operation;
   means for storing the first inline cache configured to provide fast access for storing and retrieving the first inline cache;
   means for receiving a second instance of the dynamic software operation;
   means for determining whether the first instance of the dynamic software operation and the second instance of the dynamic software operation are the same;
   means for executing the second instance of the dynamic software operation using the first inline cache from means for storing the first inline cache in response to determining that the first instance of the dynamic software operation and the second instance of the dynamic software operation are the same; and
   means for returning a result of executing the second instance of the dynamic software operation.

26. The computing device of claim 25, further comprising:
   means for receiving an object type for the second instance of the dynamic software operation;
   means for receiving an object identifier for the second instance of the dynamic software operation; and
   means for receiving inline cache data for the second instance of the dynamic software operation.

27. The computing device of claim 26, wherein means for executing the second instance of the dynamic software operation using the first inline cache from the means for storing the first inline cache in response to determining that the first instance of the dynamic software operation and the second instance of the dynamic software operation are the same comprises means for using the object type, the object identifier, and the inline cache data for the second instance of the dynamic software operation as parameters for executing the second instance of the dynamic software operation.

28. The computing device of claim 25, wherein means for determining whether the first instance of the dynamic software operation and the second instance of the dynamic software operation are the same comprises:
   means for comparing a first object implementation related to the first instance of the dynamic software operation with a second object implementation related to the second instance of the dynamic software operation; and
   means for determining whether the first object implementation and the second object implementation are the same.

29. The computing device of claim 25, further comprising:
   means for initializing a second inline cache for the second instance of the dynamic software operation including the first inline cache configured to replace the initialized first inline cache in response to determining that the first instance of the dynamic software operation and the second instance of the dynamic software operation are different;
   means for storing the second inline cache configured to provide fast access for storing and retrieving the second inline cache; and
   means for executing the second instance of the dynamic software operation using the second inline cache from means for means for storing the second inline cache in response to determining that the first instance of the dynamic software operation and the second instance of the dynamic software operation are different.

30. The computing device of claim 25, further comprising:
   means for determining whether the first inline cache exists for the first instance of the dynamic software operation; and
   wherein means for initializing the first inline cache for the first instance of the dynamic software operation comprises:
   means for initializing the first inline cache for the first instance of the dynamic software operation in response to determining that the first inline cache for the first instance of the dynamic software operation does not exist;
   means for traversing an object implementation for the dynamic software operation until identifying a data of the object implementation relating to the first instance of the dynamic software operation;
   means for executing the dynamic software operation of the first instance of the dynamic software operation; and
   means for returning a result of the first instance of the dynamic software operation.

* * * * *